C. OWEN, W. W. HECKETHORN & S. W. COLE.
TIRE TOOL.
APPLICATION FILED FEB. 25, 1911.
1,008,430.
Patented Nov. 14, 1911.
3 SHEETS—SHEET 2
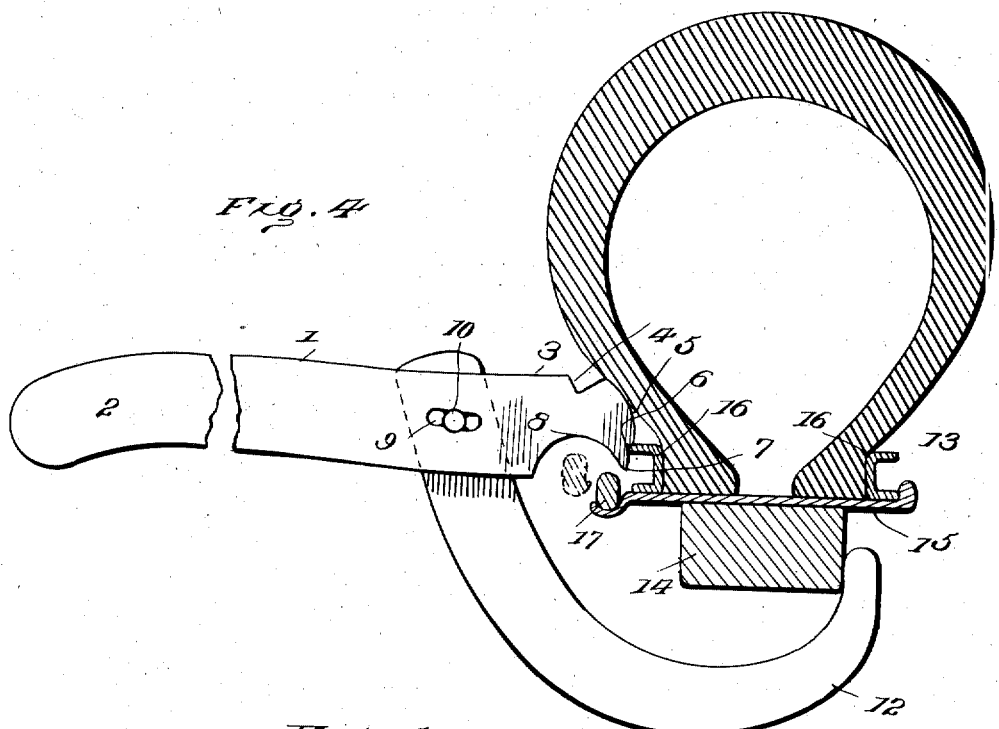
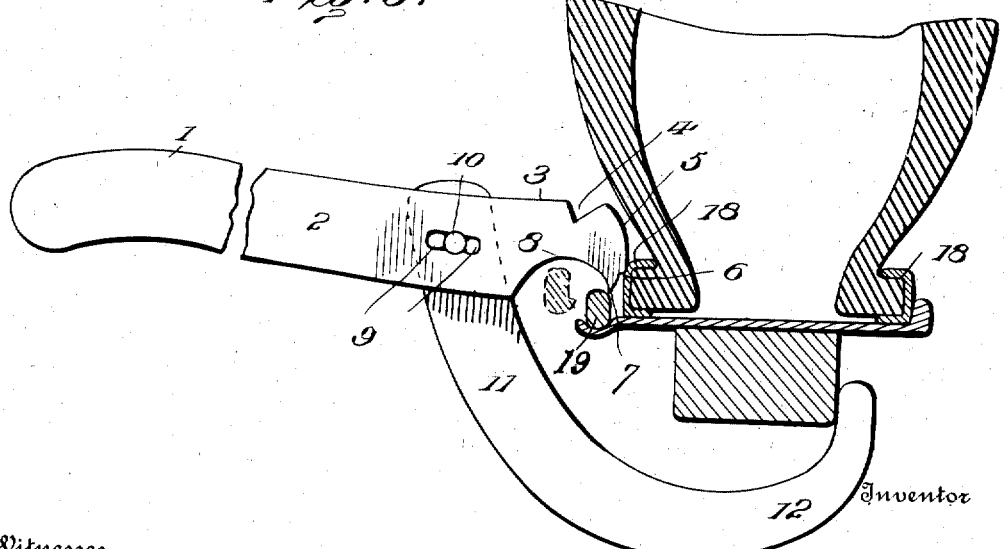
Witnesses
Edna N. Thomas
Chas. C. Richardson
Inventor
C. Owen
W. W. Heckethorn
and S. W. Cole
By Wm C. N. Antors
Attorney C. OWEN, W. W. HECKETHORN & S. W. COLE.
TIRE TOOL.
APPLICATION FILED FEB. 25, 1911.
1,008,430.
Patented Nov. 14, 1911.
3 SHEETS—SHEET 3.
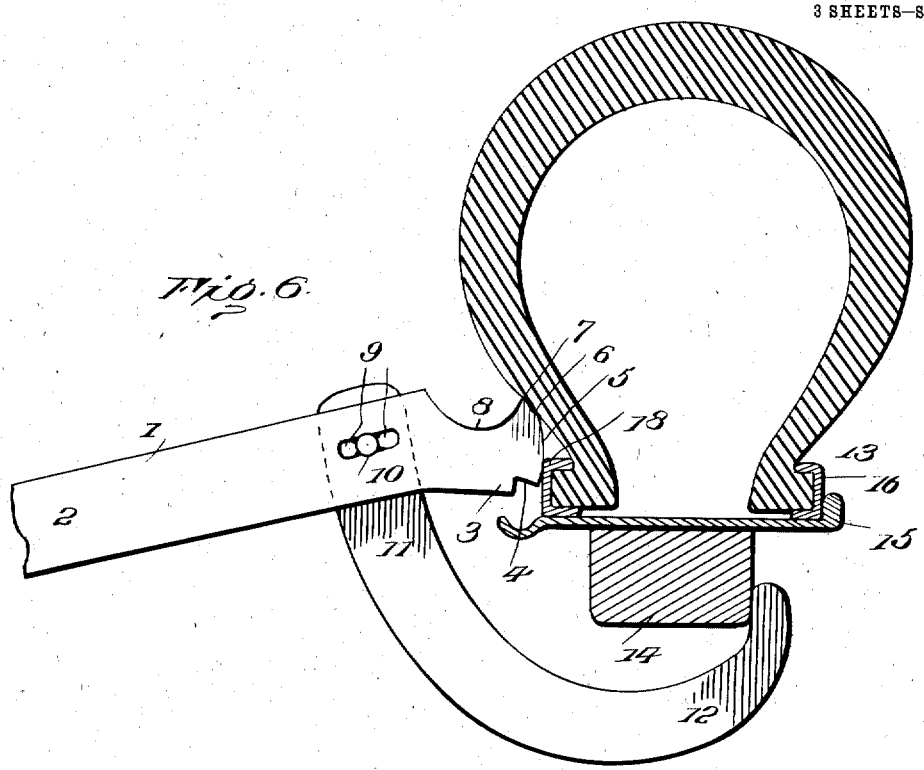
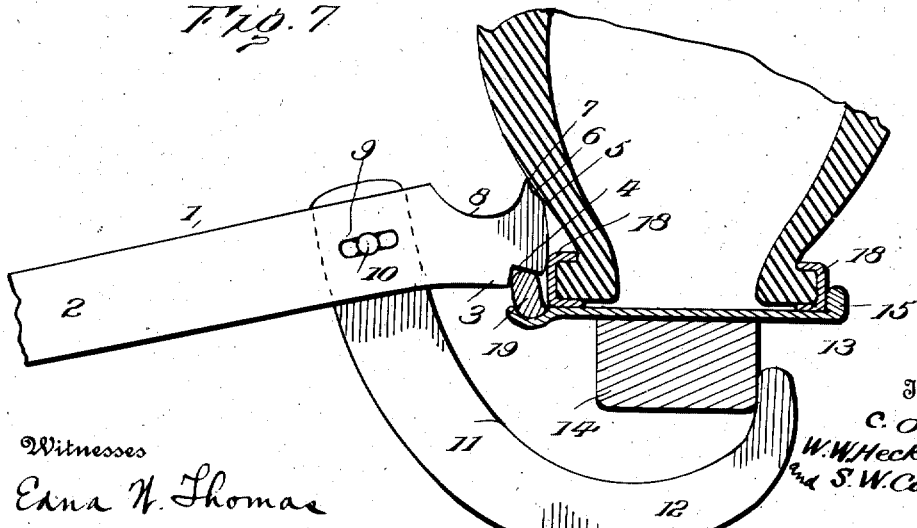

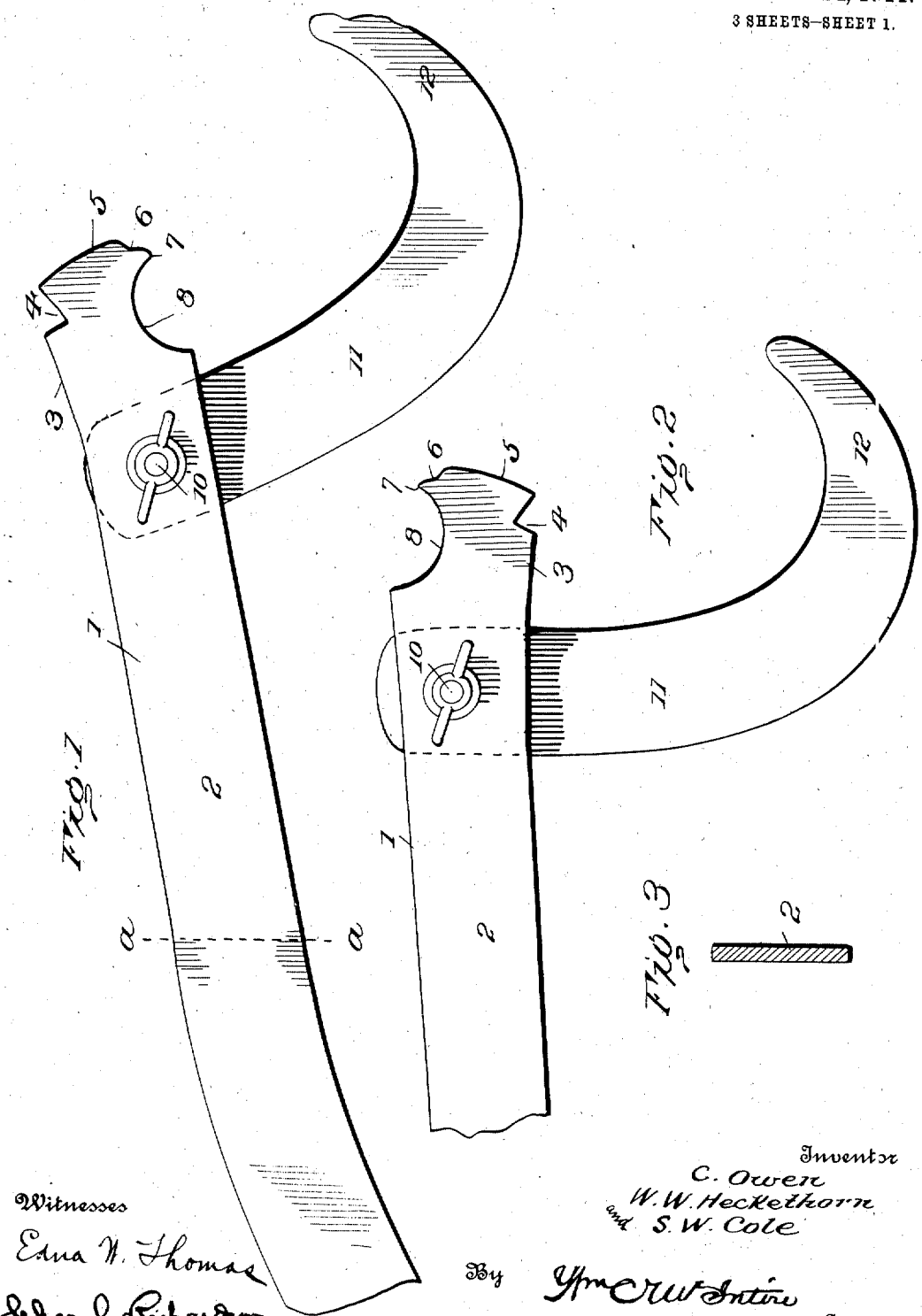

UNITED STATES PATENT OFFICE.

CHARLES OWEN, WILLIAM WALTER HECKETHORN, AND SHADRACH WILLIAM COLE, OF LAMAR, COLORADO.

TIRE-TOOL.

1,008,430. Specification of Letters Patent. Patented Nov. 14, 1911.

Application filed February 25, 1911. Serial No. 610,907.

*To all whom it may concern:*

Be it known that we, CHARLES OWEN, WILLIAM WALTER HECKETHORN, and SHADRACH WILLIAM COLE, citizens of the United States, residing at Lamar, in the county of Prowers and State of Colorado, have invented certain new and useful Improvements in Tire-Tools; and we do hereby declare the following to be a full, clear, and exact description of the invention, such as will enable others skilled in the art to which it appertains to make and use the same.

This invention relates to new and useful improvements in tools for use in connection with automobiles, and more particularly to that class most generally known as tire tools.

An object of this invention is the provision of this character which may be reversed and used either for the purpose of removing tires from or replacing them upon the rims of wheels.

Another object of this invention is to improve and simplify devices of this character, rendering them comparatively simple and inexpensive to manufacture, reliable and efficient in use, and readily operated.

With the above and other objects in view, this invention resides in the novel features of construction, formations, combinations and arrangements of parts to be hereinafter more particularly described, claimed and illustrated in the accompanying drawing, in which—

Figure 1 is a side elevation of my tool set as a tire remover; Fig. 2 is a view similar to Fig. 1, showing same reversed; Fig. 3 is a sectional view taken on the line *a—a* of Fig. 1; Fig. 4 is a view illustrating our device used in removing a tire of the Dunlop type; Fig. 5 illustrates our device in removing a tire of the clencher type; Fig. 6 is a view illustrating our device in the first position of replacing a tire, and Fig. 7 illustrates the device when used in replacing the locking ring of a tire.

Referring to the drawings by characters of reference, the numeral 1 designates generally our improved tire tool, consisting of a handle 2, the upper forward edge of which is curved, as indicated by 3, terminating in one edge of a V-shaped notch 4, the other edge of which is curved outwardly to form a cam end or nose 5, the face of which, adjacent the opposite end thereof, is provided with a notch 6 located adjacent a bearing point 7. From the bearing point the material is cut away to form a recess 3, which connects the said bearing point with the lower edge of the forward end of the handle 2. The handle 2 is provided with a series of apertures 9 located adjacent the cam end 5, and is adapted to receive a pivot point 10, which secures a swinging arm 11 adjustable upon the handle 2. The outer end of the swinging arm 11 is provided with a hooked terminal 12, for a purpose to be later disclosed.

Referring more particularly to Fig. 4 of the drawing, the numeral 13 designates a portion of a wheel of the Dunlop type, consisting of the usual felly 14, to which is secured the tire-supporting rim 15, the removable tire-engaging rings 16 of which are held in place by a locking ring 17. When it is desired to remove the tire from the Dunlop type of wheel, the hooked terminal 12 of the arm 11 is placed under the felly 14 and against one side thereof, while the notch 6 is pressed into engagement with the ring 16. As the handle 2 is moved upwardly the ring 16 will be forced inwardly, allowing the same to be disengaged from the notch 6 and rest upon the cam end 5. Obviously, upon any further upward movement of the handle 2, the bearing point 7 will engage the rear side of the locking ring 17, which will be very readily forced from its seat upon any additional upward movement of the said handle.

Referring more particularly to Fig. 5 of the drawing, which illustrates a tire of the clencher type, the hooked terminal 12 on the arm 11 is engaged, as in the previous instance, with the felly 14, while the cam end or nose 5 rests against the tire-engaging ring 18. Obviously upon the upward movement of the handle 2, the bearing point 7 will be forced behind the locking ring 19, which forces the same outwardly from engagement with the rim 15.

Referring now to Figs. 6 and 7 of the drawing, which illustrate the arm 11 in reversed position with respect to the handle 2, for the purpose of replacing a tire upon the rim, the curved end 12 of the arm 11 is engaged beneath the felly 14, and the nose 5 forced against the tire and tire-engaging ring 18 until the same is pressed inwardly sufficiently to permit the replacing of the locking ring 19, which is inserted in the V-shaped notch 4 and pressed in proper position by the depression of the handle 2.

From the foregoing disclosures, taken in connection with the accompanying drawings, it will be manifest that a tire tool is provided for which will fulfil all the necessary requirements of such a device.

Having thus fully described this invention, what I claim as new and desire to secure by Letters Patent is:

1. A tire tool, consisting of a handle having a V-shaped notch formed adjacent one end thereof, and a notched nose extending from the V-shaped notch and terminating in a bearing point and having a recess formed between the bearing point and the side thereof, and an arm pivoted to the said handle, substantially as and for the purposes set forth.

2. The combination of a handle, an arm adjustable upon said handle, a hooked terminal formed upon said arm for engagement with the felly of a wheel, a cam nose formed upon the handle for engagement with the tire-engaging ring of a wheel, whereby the same may be forced inwardly, a bearing point formed upon the handle for engagement with the locking ring of a wheel, whereby the same may be removed, the said cam nose being provided with a notch for engagement with the tire-engaging ring, whereby the same may be pressed inwardly upon the proper manipulation of the handle, the said handle also being provided with a notch for engagement with the locking ring, whereby the same may be replaced by the proper manipulation of the handle, substantially as and for the purposes set forth.

In testimony whereof we affix our signatures in presence of two witnesses.

CHARLES OWEN.
WILLIAM WALTER HECKETHORN.
SHADRACH WILLIAM COLE.

Witnesses:
LIVINGSTON N. TAYLOR,
WILLARD B. GORDON.